United States Patent [19]

Croll

[11] 4,306,249
[45] Dec. 15, 1981

[54] DIGITAL SIGNAL PROCESSING METHOD AND APPARATUS

[75] Inventor: Michael G. Croll, Horsham, England

[73] Assignee: British Broadcasting Corporation, London, England

[21] Appl. No.: 104,982

[22] Filed: Dec. 18, 1979

[30] Foreign Application Priority Data

Dec. 20, 1978 [GB] United Kingdom ............... 49293/78

[51] Int. Cl.³ ............................................. H04N 7/12
[52] U.S. Cl. ................... 358/133; 358/21 R;
358/138; 358/160
[58] Field of Search .................. 358/138, 133, 160, 21

[56] References Cited

U.S. PATENT DOCUMENTS 2,921,124 1/1960 Graham ............................. 358/138
3,571,494 3/1971 Law ..................................... 358/21

FOREIGN PATENT DOCUMENTS 903478 8/1962 United Kingdom .
1455822 11/1976 United Kingdom .

OTHER PUBLICATIONS

Clark, C. K. P., "Digital Television: The Use of Waveform Estimates in Error Correction", BBC Research Department Report, BBC RD 1977/27, Aug., 1977.

*Primary Examiner*—Howard Britton
*Attorney, Agent, or Firm*—Robert F. O'Connell

[57] ABSTRACT

Encoded digital television signals having a defined bandwidth are transmitted at reduced bandwidth by regularly omitting (18) one in every n of the signal samples, where n is greater than two and is preferably three or four. At a receiver the omitted samples are regenerated by estimating (26) their values from the samples of the reduced-rate transmitted signal by making use of frequency components outside the normal defined bandwidth of the original signal. The estimation can be achieved by a symmetrical digital transversal filter of which one in every n coefficients is zero, the amplitude/frequency characteristics of the filter being unity throughout the defined bandwidth of the TV signal and antisymmetric about half the mean lower sample rate.

24 Claims, 5 Drawing Figures

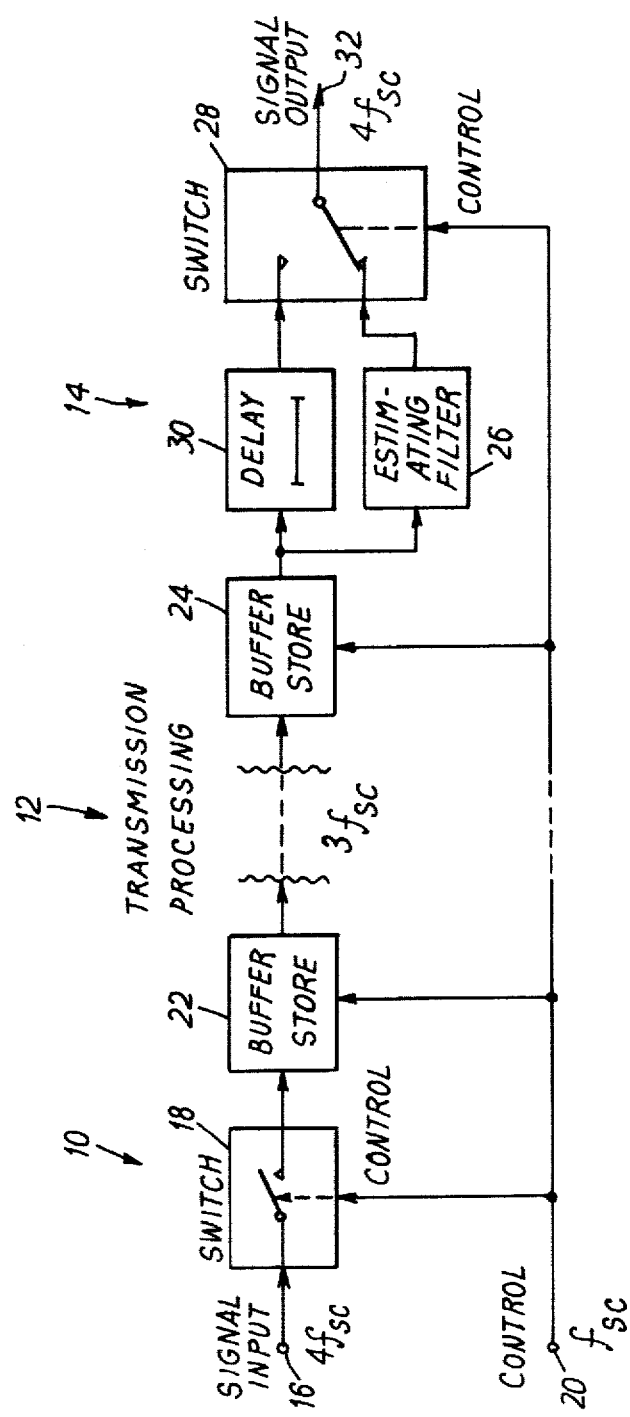

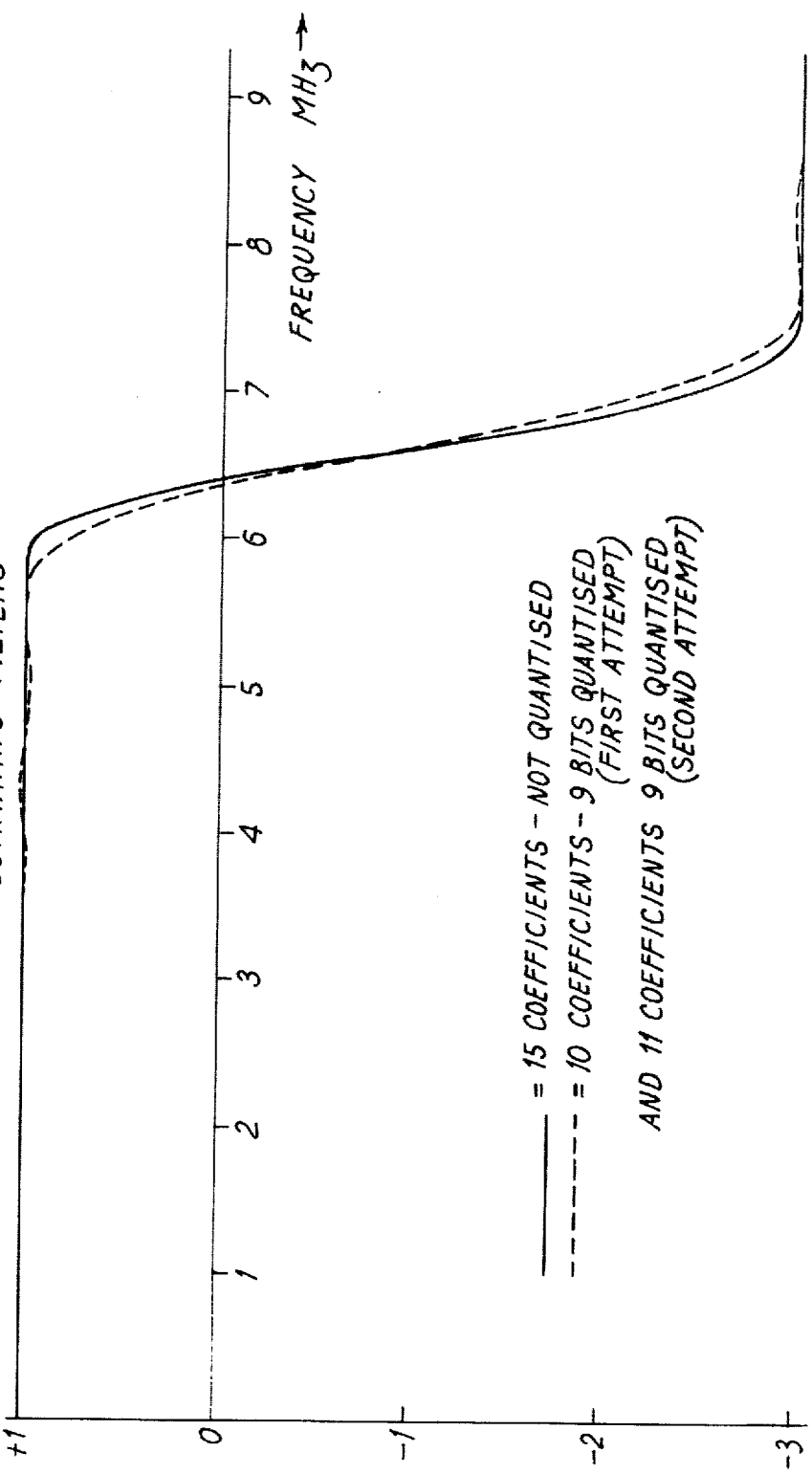

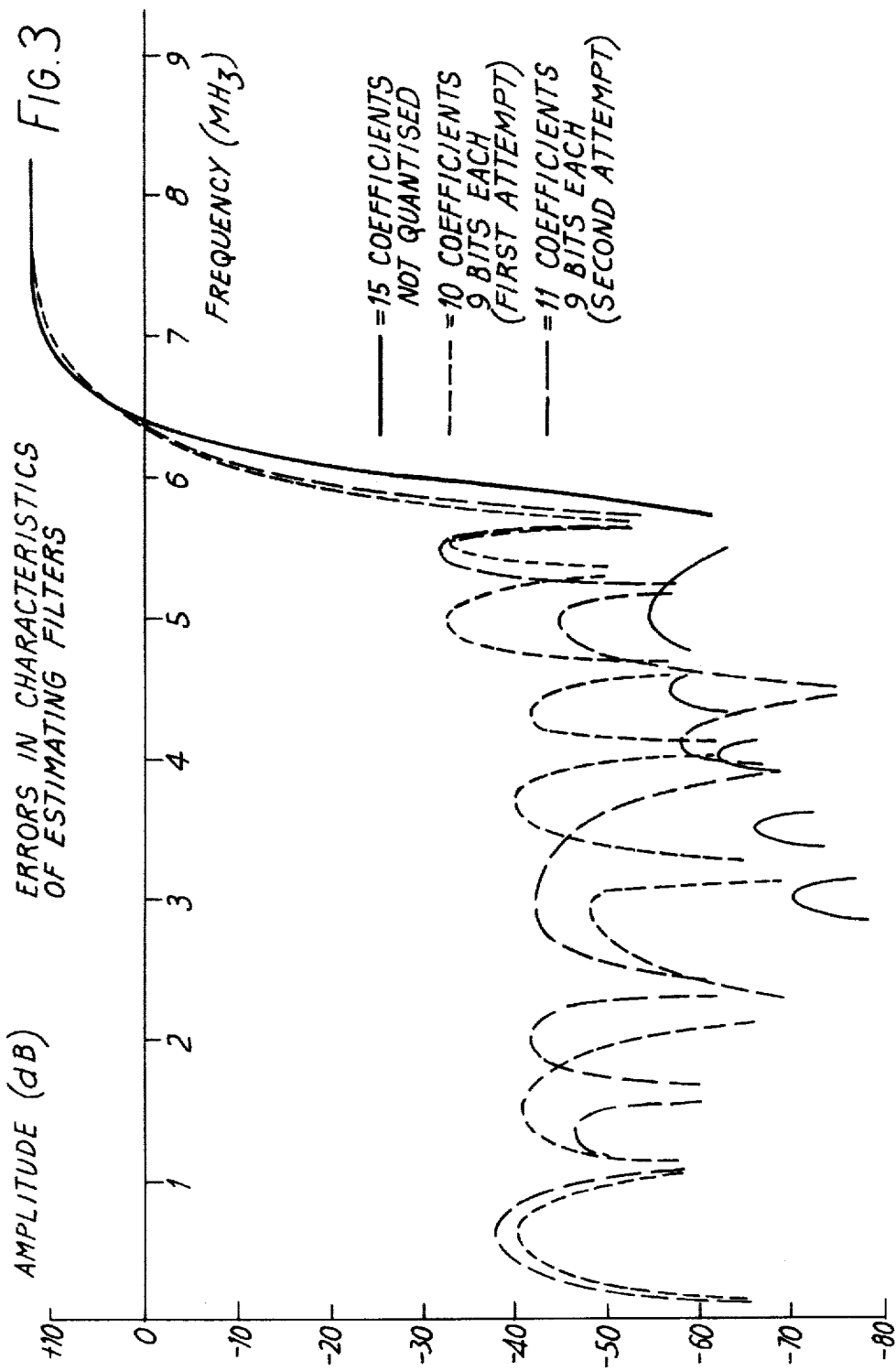

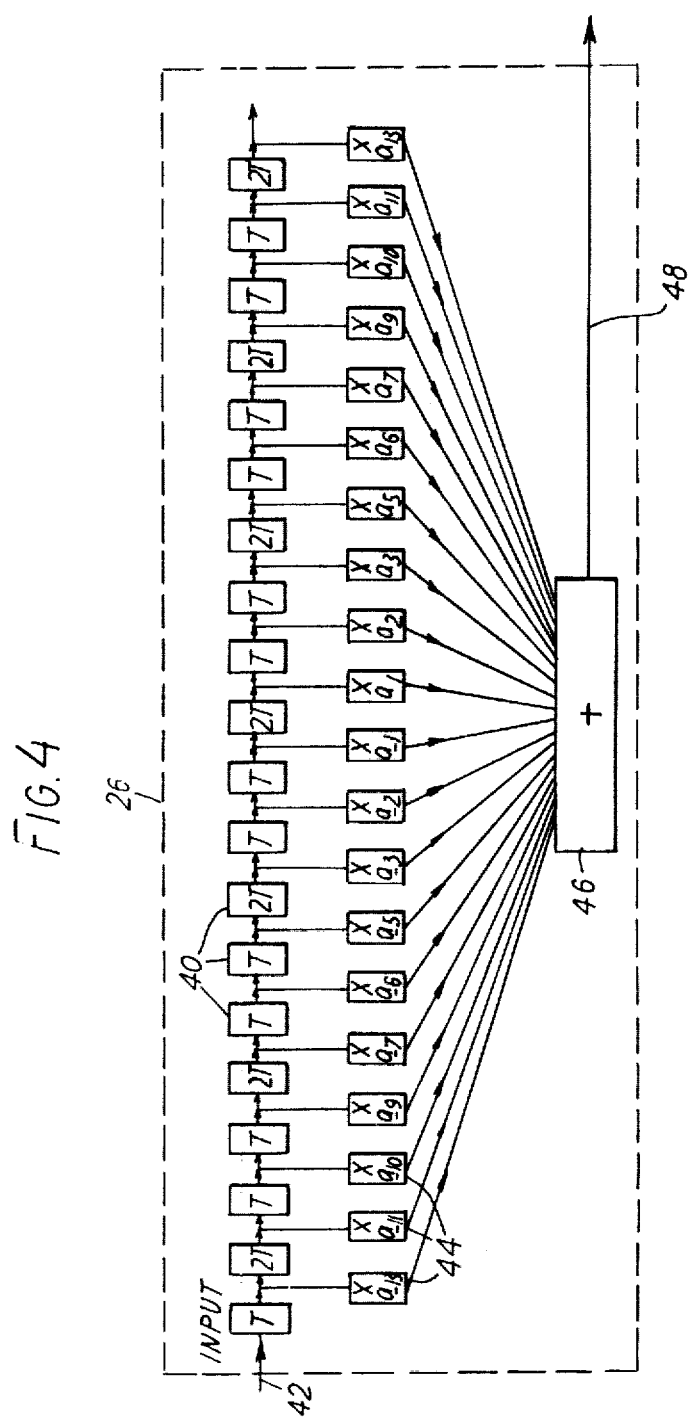

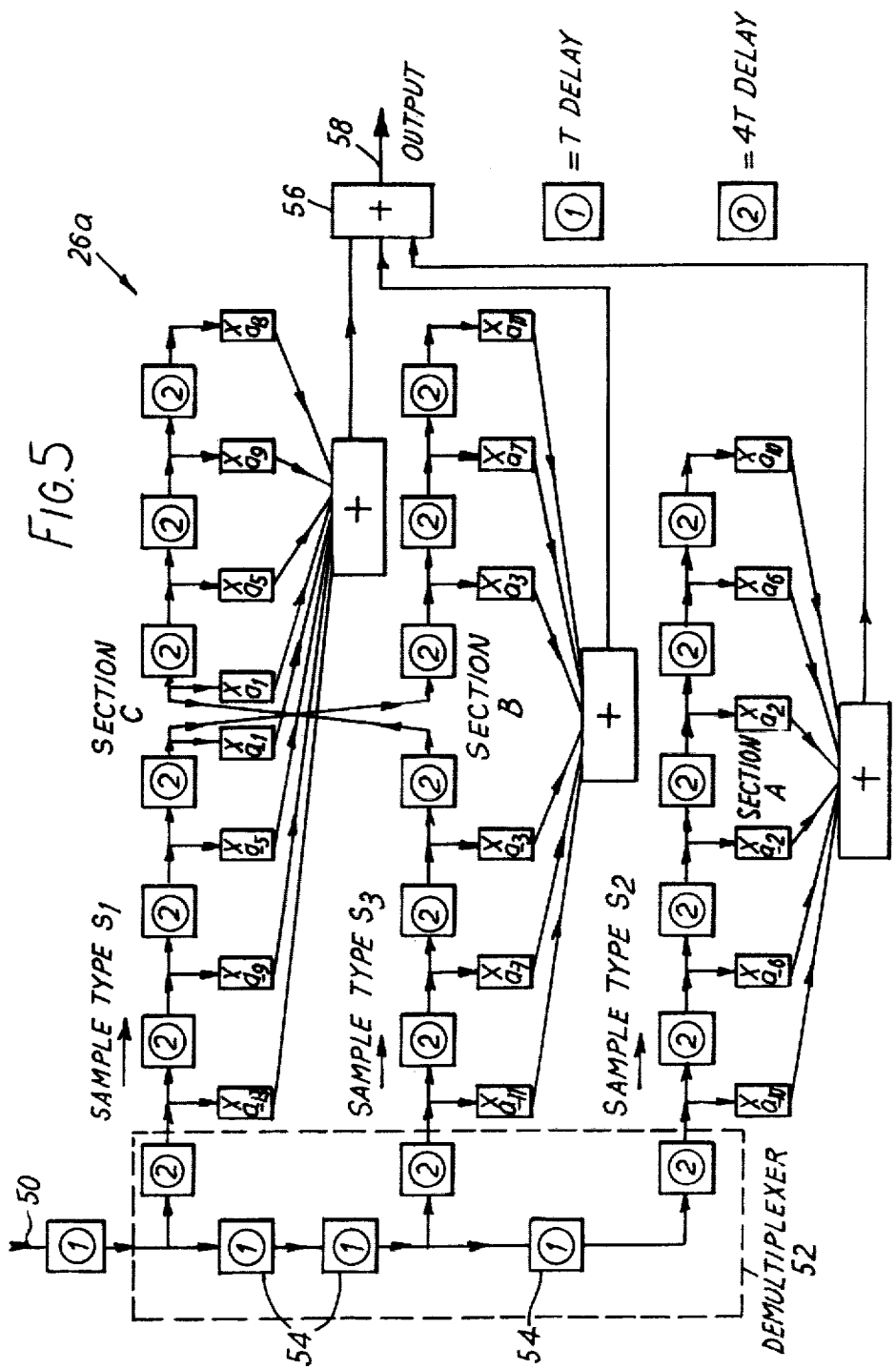

DIGITAL SIGNAL PROCESSING METHOD AND APPARATUS

BACKGROUND OF THE INVENTION

This invention relates to a method of and apparatus for digital signal processing. The invention will be described with reference to the processing of digital system I PAL colour television signals, to which it is especially applicable, but it is not restricted to application to television signals.

Prior proposals for bit-rate reduction of encoded digital television signals are described in British Pat. Nos. 903,478; 1,029,815 and 1,286,981. These systems all involve discarding a major part of the information before transmission. Thus in the case of British Pat. No. 903,478 either one out of every three or one out of every eight samples only are transmitted, the remaining samples being discarded. In British Pat. No. 1,029,815 one out of every three or one out of every nine samples are transmitted, and in the case of British Pat. No. 1,286,981 either one out of every two or one out of every four or one out of every eight samples are transmitted.

Thus the transmitted sample train is a regular stream of samples at a much reduced rate. The information content of the samples corresponds to a regular pattern along the television line scan. At a receiver the discarded samples cannot be regenerated, but instead the missing samples are replaced by interpolation between the transmitted samples, using some form of interpolating filter.

An error protection system has been described in *BBC Research Department Report* 1978/19 (M. G. Croll) which is based on proposals in *BBC Research Department Report* 1977/27 (C. K. P. Clarke), see particularly section 3.2.1, and which makes use of the fact that the system I PAL television signal has a bandwidth which is limited to 5.5 MHz. If such a signal is sampled at three times the colour subcarrier frequency $f_{sc}$, then the sample rate is approximately 13.3 MHz, and thus, following Nyquist principles, the digital system can convey frequencies up to half the sampling rate, i.e. 6.65 MHz.

This means that there is a frequency range of between 5.5 MHz and 6.65 MHz which is conveyed by the system but which should in principle contain no frequency components. The error-protection systems of the above Reports effectively operate by looking for information in this frequency range, and assuming that any such information is caused by errors introduced into the signal during processing or transmission. With the aid of an estimator based on a high-pass symmetrical digital transversal filter, it is shown to be possible to determine which bits of the digital signal are in error, and to determine the sense or polarity of the error. This enables errors in a binary television signal to be detected and corrected.

Reference should be made to the above-mentioned Reports for further details of the error-protection system and its theory of operation.

SUMMARY OF THE INVENTION

This invention is based on the realisation that such a system provides the key to a novel and interesting method of simplifying the long-standing problem of bit rate reduction in a digital signal. The present invention is defined in the appended claims.

In accordance with this invention we provide a digital signal processing system in which a digital input signal having a defined bandwidth is received at a first sample rate, and one in every n of the input samples are regularly omitted to provide a reduced-rate signal at a second, lower sample rate for transmission or processing, where n is greater than two, and subsequently the omitted samples are regenerated by estimating their values from the samples of the reduced-rate signal by making use of frequency components outside the said bandwidth.

Conveniently n is an integer. The second sample rate fs2 is related to the first sample rate fs1 as follows:

$$n f_{s2} = (n-1)f_{s1}.$$

This is applicable so long as fs2 is above the Nyquist limit, i.e. is not less than twice the maximum frequency of the baseband input signal. The value of n can be chosen accordingly.

The estimation of the errors is preferably achieved by the use of a digital transversal filter. This filter will preferably have one in every n multiplier coefficients equal to zero.

The invention also provides a system for use in forming a digital signal at a higher sample rate from a signal at a lower rate which has in turn been formed by omitting one in every n samples from a signal at the higher rate having a defined bandwidth, where n is greater than two, the system being operative to estimate the values of the omitted samples by making use of frequency components outside the said bandwidth of the higher rate signal.

The invention further provides a method and apparatus in which a signal is received at the said lower sample rate, and to regenerate the missing samples is filtered with a filter the amplitude/frequency characteristic of which is substantially unity throughout the said defined bandwidth, and is antisymmetric about half the mean lower sample rate.

Preferably the filter has substantially the following characteristics:

(a) unity response throughout the said defined bandwidth 0 to fv, (b) an antisymmetric curve about half the mean lower sample rate $\tfrac{1}{2}f_L$ above the said defined bandwidth up to the frequency $f_L - f_v$, (c) A constant value between $f_L - f_v$ and half the higher sample rate $\tfrac{1}{2}f_H$, and (d) the total area under the curve in the range 0 to $\tfrac{1}{2}f_H$ is zero.

The invention is of particular utility in the bit-reduction of digital encoded colour television video signals. $4f_{sc}$ is a convenient sampling standard for many digital video coding applications and is compatible with $2f_{sc}$ in low bit-rate digital video systems. However, to minimise the bit rate, $3f_{sc}$ is a desirable choice for a 5.5 MHz bandwidth system I PAL television signal. The extravagant $4f_{sc}$ sample rate requires an inconveniently high rate for processing digital video words and leads to an increased size of storage compared with that required for a $3f_{sc}$ sampled signal.

In accordance with this invention, one method of retaining the benefits of the $4f_{sc}$ sampling structure and yet lowering the digital video word-rate would be to omit one in four of the digital video samples of a $4f_{sc}$ sampled video signal. The samples which remain are quite capable of accurate description of video information up to 5.5 MHz. Where all the $4f_{sc}$ samples are again required, e.g. for decoding, the missing samples can be regenerated using a waveform estimating filter. This filter can be simpler, and hence much cheaper, than the interpolating filter that would be required to convert $3f_{sc}$ regularly spaced samples to $4f_{sc}$. It only has to make one new sample every subcarrier period, rather than the three required in the latter case.

The $3f_{sc}$ samples produced by omitting every fourth sample can be time redistributed or buffered so that they occur regularly at the $3f_{sc}$ rate. However, they do not represent regular sampling positions on the television line scan, the information which they represent is irregular, and is defined by reference to the initial $4f_{sc}$ sampling rate. The regeneration of the missing samples is not now achieved by simple interpolation.

BRIEF DESCRIPTION OF THE DRAWINGS

The invention will now be described in more detail, by way of example, with reference to the drawings, in which:

FIG. 1 is a block diagram of a system embodying the invention;

FIG. 2 is a diagram showing the frequency characteristics of possible estimating filters;

FIG. 3 is a graph illustrating errors in the frequency response of the filters;

FIG. 4 is a block diagram of a simple form of estimating filter for use in the system of FIG. 1; and FIG. 5 is a block diagram of an alternative preferred form of estimating filter.

DETAILED DESCRIPTION OF THE PREFERRED EMBODIMENT

FIG. 1 shows a system embodying the invention which comprises a sample reduction stage 10, a transmission or processing stage 12, which is not shown in detail and is for the purposes of this invention largely immaterial, though as an example it may be constituted by a video tape recorder, and finally a sample regeneration stage 14. A digital colour television signal is received at an input terminal 16 in encoded PAL form at a sample rate of $4f_{sc}$, i.e. 17.72 MHz. This signal is applied to a switch 18 which is normally closed (conductive) but is opened for every fourth sample in accordance with a signal received at a control input 20. This control signal consists of pulses at the subcarrier frequency $f_{sc}$ and can be derived in any convenient way, e.g. from the signal at input 16.

The switch 18 thus selects three out of every four input samples and discards the fourth. The phase of the omitted samples is controlled by reference to the television waveform colour burst or synchronisation pulses. The three remaining samples are therefore irregularly timed, and are applied to a buffer store 22 which redistributes the samples to form a continuous retimed sample stream at the $3f_{sc}$ sample rate, i.e. at 13.3 MHz.

After processing, the samples are applied to another buffer store 24. This buffer store converts the $3f_{sc}$ sample rate to a $4f_{sc}$ sample rate by inserting "dummy" samples, one after each three samples received, and retiming the samples. The dummy samples can have a value of zero. Thus the signal at the output of the buffer store 24 is at a $4f_{sc}$ sample rate, although every fourth sample is entirely erroneous and is subsequently discarded.

An estimating filter 26 is connected to the output of the buffer store 24. The estimating filter can be of similar construction to the digital transversal filter shown in FIG. 2(a) of the abovementioned Report 1977/27. The filter parameters are discussed in more detail below, and preferred examples are described with reference to FIGS. 4 and 5. The filter generates from the output of the buffer store 24 samples which are applied to one input of a selector switch 28. The buffer store 24 is connected to the other input of the switch through an equalising delay 30, which compensates for the delay introduced in the estimating filter 26, to ensure that the samples arrive at the two switch inputs with the correct timing. The switch 28 continuously selects three samples from the delay 30 then one sample from the filter 26, such that the dummy samples are discarded and are replaced by samples from the filter 26. The switch is controlled by $f_{sc}$ control pulses which are either conveyed from the sample omission system 10, as shown, or alternatively could be regenerated from the signal waveform.

Methods similar to those used to generate the control pulses for sample omission could be used, or the phase discovered by trial and error during a known portion of the television waveform.

The switch output 32 constitutes the system output and is at $4f_{sc}$.

The estimating filter 26 accurately determines missing samples from surrounding sample values on the basis that the digital video signal contains signal energy up to 5.5 MHz only. The estimating filter in principle incorporates a transversal measurement filter as described in the above-mentioned Reports, namely a high-pass filter covering the range 5.5 MHz to 6.65 MHz, the output of which has a magnitude proportional to the difference between the missing sample value and the substituted sample value, the output of the measurement filter being subtracted from the input video signal. The timing relationship in the subtraction is made to be such that the temporal location of the missing sample is put at the central position of the transversal measurement filter. Thus, any data at that location then plays no part in estimating the value of the missing sample. Hence, an estimating filter can be derived from a measurement filter by negating each term and setting the central term to zero.

The filter parameters will now be considered. To estimate every fourth sample of a $4f_{sc}$ sampled signal, it is a requirement of the time response of the estimating filter that every fourth coefficient shall be zero. Also, to be a good estimating filter, it should have unity gain within the 5.5 MHz video passband.

To assess whether such a filter is feasible, we have designed some, and computed their responses. A first filter had 15 coefficients symmetrically either side of the point being estimated. The coefficients are given by:

$$a_i = -(-1)^i \frac{\sin i\pi/4}{i\pi/4} \cdot \tfrac{1}{2}(1 + \cos i\pi/20)$$

this being a combination of the functions $(\sin x)/x$ and raised cosine. Note that for $i=0$ or any multiple of four, then $a_i=0$. The response of this filter is given in FIG. 2, and a logarithmic plot of the error of the estimation is given in FIG. 3.

The response of filters which are more practicable are also given in these figures for 'first attempt' and 'second attempt'. These are similar to the other filter but with the number of coefficients reduced (16 is substituted for 20 in the raised cosine part of the expression given above). The two attempts give different ways of quantising the coefficients to nine bit accuracy. The coefficients are given in the following table.

estimating filters where every nth coefficient is zero. This ensures that the dummy samples, inserted initially in every nth sample position, are not taken into account

| Coefficients ($a_i$) | $a_1$ | $a_2$ | $a_3$ | $a_5$ | $a_6$ | $a_7$ | $a_9$ | $a_{10}$ | $a_{11}$ | $a_{13}$ | $a_{14}$ | $a_{15}$ |
|---|---|---|---|---|---|---|---|---|---|---|---|---|
| First attempt | +228 | −156 | +70 | −35 | +37 | −19 | +10 | −10 | +4 | −1 | +0 | −0 |
| Second attempt | +228 | −157 | +70 | −36 | +38 | −20 | +10 | −10 | +5 | −1 | +1 | −0 |

In this table, the coefficients are given multiplied by 256. The coefficients $a_0$, $a_4$, $a_8$, $a_{12}$ and $a_{16}$ are omitted as they are all zero.

Of the two possibilities given in the Table, the second attempt gives marginally the better response. An interesting feature of the error response of this filter is that it contains a zero and point of inflexion at colour subcarrier frequency. This filter would give a good performance, and only a limited type of large amplitude signals cause errors in excess of 2 quantum steps in the estimated samples. Also, no particularly stringent specification would be required of the analogue pre-coding filter. A filter of the type normally used in $3f_{sc}$ coding systems would be adequate. However, it should be noted that half sampling frequency dither cannot be used in a system like this where frequencies around half sampling frequency are used in forming waveform estimates.

Referring again to FIG. 2, it is seen that the amplitude/frequency response of the filter is substantially as follows:

(a) Unity throughout the normal signal bandwidth of 0 to 5.5 MHz.

(b) An anti-symmetric curve about half the mean lower sample rate $\frac{1}{2}f_L$ (6.65 MHz) between the maximum normal signal frequency $f_v$ (5.5 MHz) and the frequency $f_L - f_v$ (7.8 MHz).

(c) A constant value between $f_L - f_v$ and half the higher sample rate $\frac{1}{2}f_H$ (8.86 MHz).

(d) The total positive area under the curve, in the range 0 to $\frac{1}{2}f_L$ (6.65 MHz), equals the total negative area under the curve, in the range $\frac{1}{2}f_L$ (6.65 MHz) to $\frac{1}{2}f_H$ (8.86 MHz), ie the total area under the curve is zero.

These constraints lead to an amplitude of −1 at the lower sample rate in the example of n=4, and a constant value of −3 in the range $\frac{1}{2}f_L$ to $\frac{1}{2}f_H$. If one in three samples were to be omitted, then the amplitude at $\frac{1}{2}f_L$ (5.9 MHz) becomes $-\frac{1}{2}$, and the constant value between $f_L - f_v$ (6.31 MHz) and $\frac{1}{2}f_H$ (8.86 MHz) becomes −2.

Such a filter when implemented as a digital transversal filter has every nth coefficient set to zero.

Normally, with the system proposed here, the one-in-four $4f_{sc}$ samples omitted would be selected on a regular continuous basis. However, there might be an advantage, for some applications, in choosing a different omission pattern. This could be arranged by, in effect, resetting the phase for omission each television line in the line-blanking interval. In this way, omission patterns which repeat each picture and are very nearly line-locked could be generated with obvious advantages for systems where picture processing uses the vertical and horizontal relationships of samples. Other omission patterns might enable simpler estimating filters to be used where the pattern produced by deficiencies in the filter is chosen to be least visible.

The above is an example of the general case in which one in every n samples is omitted for a digital signal. Preferred values of n for digital television work are 3 or 4. Such values of n are accommodated by selecting in estimating the new samples which are used to replace the dummy data in the final sample stream.

The construction of suitable filters for use as the estimating filter 26 is illustrated in FIGS. 4 and 5. Referring first to FIG. 4, the filter 26 is seen to take the form of a transversal filter, in which every fourth coefficient is set to zero. The filter illustrated is suitable for the "first attempt" filter mentioned above. The filter comprises a plurality of delay elements 40 connected in series to the input 42 and providing delays of T or 2T, where T is the sample period, in the repeated sequence T, 2T, T. The output of each delay element 40 is multiplied in a respective one of the multipliers 44 by the appropriate multiplier coefficient, given in the table above. The outputs of all the multipliers 44 are summed in an adder 46, the output of which constitutes the output 48 of the filter 26.

FIG. 5 shows an alternative form 26a of the filter which is more economic and less demanding of high speed components. This arrangement reduces the rate at which digital samples are processed in the main part of the filter to the same lower rate at which samples are required at the filter output. Samples applied to the input 50 are first demultiplexed in a demultiplexer 52 having three outputs. The demultiplexer comprises a series of sample delays 54 connected in series, such that if the input sample stream is a series of samples in the recurring sequence $S_1$, $S_2$, $S_3$, X; $S_1$, $S_2$, $S_3$, X, where X denotes the position of the dummy samples, then samples of type $S_1$, $S_2$ and $S_3$ appear at the three demultiplexer outputs respectively, as indicated on FIG. 5.

Samples of the type $S_2$ are applied to the lowermost portion of the filter circuit, referenced Section A. This section is in itself a small transversal filter, making use of the coefficients $a_{\pm 2}$, $a_{\pm 6}$ and $a_{\pm 10}$, and having four-sample delays.

Sections B and C are cross-coupled transversal filters so arranged that Section B makes use of the coefficients $a_{\pm 3}$, $a_{\pm 7}$ and $a_{\pm 11}$, and Section C makes use of the coefficients $a_{\pm 1}$, $a_{\pm 5}$, $a_{\pm 9}$ and $a_{\pm 13}$. The samples $S_3$ and $S_1$ are fed to appropriate ones of the multipliers as illustrated in the figure. The outputs of the three sections are summed in a final adder 56, the output 58 of which constitutes the circuit output. This output is at the same sample rate as the rate at which the switch 28 (FIG. 1) discards dummy samples and selects the output of the estimating filter 26.

The instrumentation of FIG. 5 is applicable in general to the omission of one in n samples. One A type Section is required only if n is even. The other Sections of the filter are cross-coupled in pairs.

The filters of this type make use of the redundant information in the television signal by deriving from the frequency components between the maximum video frequency and the Nyquist frequency a signal which supplies the missing samples of the $4f_{sc}$ sampling structure. This thus enables the sample rate, and hence the bit rate, to be reduced, in the knowledge that the higher sample rate can subsequently be regenerated.

What I claim is:

1. A method of processing a digital signal, comprising:
   receiving a digital input signal having a defined bandwidth at a first sample rate;
   regularly omitting one in every n of the input samples to provide a reduced-rate signal at a second, lower sample rate for transmission or processing, where n is greater than two; and
   subsequently regenerating the omitted samples by estimating their values from the samples of the reduced-rate signal by making use of frequency components outside the said bandwidth.

2. A method according to claim 1, in which n is an integer greater than or equal to three.

3. A method according to claim 1, in which the input signal is an encoded colour television signal.

4. A method according to claim 3, in which the sample rate of the input signal is four times the colour subcarrier frequency of the signal.

5. A method according to claim 4, in which one in three of the input signal samples are omitted.

6. A method according to claim 1, in which the regeneration step is achieved by use of an estimating filter the amplitude/frequency characteristic of which is substantially unity throughout the said defined bandwidth, and is antisymmetric about half the mean lower sample rate.

7. A method of forming a digital signal at a higher sample rate from a signal at a relatively lower sample rate which has in turn been formed by omitting one in every n samples from a signal at the higher rate having a defined bandwidth, where n is greater than two, comprising receiving a signal at said lower sample rate, and estimating the values of the omitted samples from the samples of the lower-rate signal by making use of frequency components outside the said bandwidth of the higher rate signal.

8. A method of forming a digital signal at a higher sample rate from a signal at a relatively lower sample rate which has in turn been formed by omitting one in every n samples from a signal at the higher rate having a defined bandwidth, where n is greater than two, comprising receiving a signal at said lower sample rate, and filtering the received signal with a filter the amplitude/frequency characteristic of which is substantially unity throughout the said defined bandwidth, and is antisymmetric about half the mean lower sample rate.

9. A method according to claim 8 in which the filter has substantially the following characteristics:
   (a) unity response throughout the said defined bandwidth 0 to fv,
   (b) an antisymmetric curve about half the mean lower sample rate $\tfrac{1}{2}f_L$ above the said defined bandwidth up to the frequency $f_L - f_v$,
   (c) a constant value between $f_L - f_V$ and half the higher sample rate $\tfrac{1}{2}f_H$, and
   (d) the total area under the curve in the range 0 to $\tfrac{1}{2}f_H$ is zero.

10. A method according to claim 9, in which the filter is a digital transversal filter each nth coefficient of which is set to zero.

11. Apparatus for processing a digital signal, comprising:
   an input for receiving a digital input signal at a first sample rate having a defined bandwidth;
   means connected to the input for regularly omitting one in every n of the input samples to provide a reduced-rate signal at a second, lower sample rate for transmission or processing, where n is greater than two; and
   means for subsequently regenerating the omitted samples by estimating their values from the samples of the reduced-rate signal by making use of frequency components outside the said bandwidth.

12. Apparatus according to claim 11, in which n is an integer.

13. Apparatus according to claim 11, in which the regenerating means comprises a transversal filter.

14. Apparatus according to claim 13, in which the transversal filter is a symmetrical filter in which one in every n coefficients is zero.

15. Apparatus according to claim 11, in which the regenerating means comprises a filter the amplitude/frequency characteristic of which is substantially unity throughout the said defined bandwidth, and is antisymmetric about half the mean lower sample rate.

16. Apparatus according to claim 15, in which the filter has substantially the following characteristics:
   (a) unity response throughout the said defined bandwidth 0 to $f_v$,
   (b) an antisymmetric curve about half the mean lower sample rate $\tfrac{1}{2}f_L$ above the said defined bandwidth up to the frequency $f_L - f_v$,
   (c) a constant value between $f_L - f_v$ and half the higher sample rate $\tfrac{1}{2}f_H$, and
   (d) the total area under the curve in the range 0 to $\tfrac{1}{2}f_H$ is zero.

17. Apparatus according to claim 16, in which the filter is a digital transversal filter each nth coefficient of which is set to zero.

18. Apparatus according to claim 11, including a buffer store connected to the output of the omitting means for retiming the samples.

19. Apparatus according to claim 11, including a buffer store connected before the regeneration means for retiming the samples.

20. Apparatus for forming a digital signal at a higher sample rate from a signal at a relatively lower sample rate which has in turn been formed by omitting one in every n samples from a signal at the higher rate having a defined bandwidth, where n is greater than two, comprising an input for receiving a signal at said lower sample rate, and means for estimating the values of the omitted samples from the samples of the lower-rate signal by making use of frequency components outside the bandwidth of the higher rate signal.

21. Apparatus according to claim 20, in which the estimating means comprises a filter the amplitude/frequency characteristic of which is substantially unity throughout the said defined bandwidth, and is antisymmetric about half the mean lower sample rate.

22. Apparatus according to claim 21, in which the filter has substantially the following characteristics:
   (a) unity response throughout the said defined bandwidth 0 to fv,
   (b) an antisymmetric curve about half the mean lower sample rate $\tfrac{1}{2}f_L$ above the said defined bandwidth up to the frequency $f_L - f_v$,
   (c) a constant value between $f_L - f_v$ and half the higher sample rate $\tfrac{1}{2}f_H$, and
   (d) the total area under the curve in the range 0 to $\tfrac{1}{2}f_H$ is zero.

23. Apparatus according to claim 22, in which the filter is a digital transversal filter each nth coefficient of which is set to zero.

24. A method according to claim 4, in which one in four of the input signal samples are omitted.

* * * * *